United States Patent
Dai et al.

(10) Patent No.: US 9,341,333 B2
(45) Date of Patent: May 17, 2016

(54) WINDOW GLASS

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/585,662

(22) Filed: Dec. 30, 2014

(65) Prior Publication Data
US 2016/0069524 A1 Mar. 10, 2016

(30) Foreign Application Priority Data
Sep. 9, 2014 (TW) ............................. 103131061 A

(51) Int. Cl.
*F21S 11/00* (2006.01)
*G02B 19/00* (2006.01)

(52) U.S. Cl.
CPC ........... *F21S 11/007* (2013.01); *G02B 19/0009* (2013.01); *G02B 19/0042* (2013.01)

(58) Field of Classification Search
CPC ..... G02B 3/08; G02B 19/0042; F21S 11/002; F21S 11/007
USPC .......................................... 359/591–592, 742
See application file for complete search history.

(56) References Cited

U.S. PATENT DOCUMENTS

| | | | | |
|---|---|---|---|---|
| 3,255,665 A | * | 6/1966 | Weiher | F21S 11/00 359/595 |
| 4,204,881 A | * | 5/1980 | McGrew | G02B 5/32 126/684 |
| 4,357,074 A | * | 11/1982 | Nardini | A01G 9/1438 359/592 |
| RE33,795 E | * | 1/1992 | Ogino | G03B 21/625 353/74 |
| 7,460,301 B2 | * | 12/2008 | Imafuku | G03B 21/10 348/E5.137 |
| 8,303,122 B2 | * | 11/2012 | Hughes | E06B 3/6715 359/601 |
| 2007/0115548 A1 | * | 5/2007 | Ebina | G02B 3/08 359/460 |

* cited by examiner

*Primary Examiner* — Christ Mahoney
(74) *Attorney, Agent, or Firm* — Novak Druce Connolly Bove + Quigg LLP

(57) ABSTRACT

A window glass includes an incident surface, an emergent surface opposite to the incident surface, a bottom surface, and a top surface opposite to the bottom surface. The incident surface and the emergent surface are interconnected between the top surface and the bottom surface. A plurality of sawteeth is defined on the emergent surface. Each sawtooth includes a first surface adjacent to the top surface and a second surface adjacent to the bottom surface. In each sawtooth, an angle between the first surface and the incident surface is over 90 degrees. The second surface and the incident surface cooperatively define an acute angle. The acute angle increases from the top surface down to the bottom surface and causes the redirection of early morning sunlight up to a ceiling of a room or building containing the window glass.

12 Claims, 3 Drawing Sheets ial view of an embodiment of a window
WINDOW GLASS

FIELD

The subject matter herein generally relates to a window glass.

BACKGROUND

Window glasses serve not only to provide a view to the outside but also to allow sunlight to enter a building. Sunlight entering the building is reflected by objects arranged in the building.

BRIEF DESCRIPTION OF THE DRAWINGS

Implementations of the present technology will now be described, by way of example only, with reference to the attached figures.

DETAILED DESCRIPTION

Figure 1:
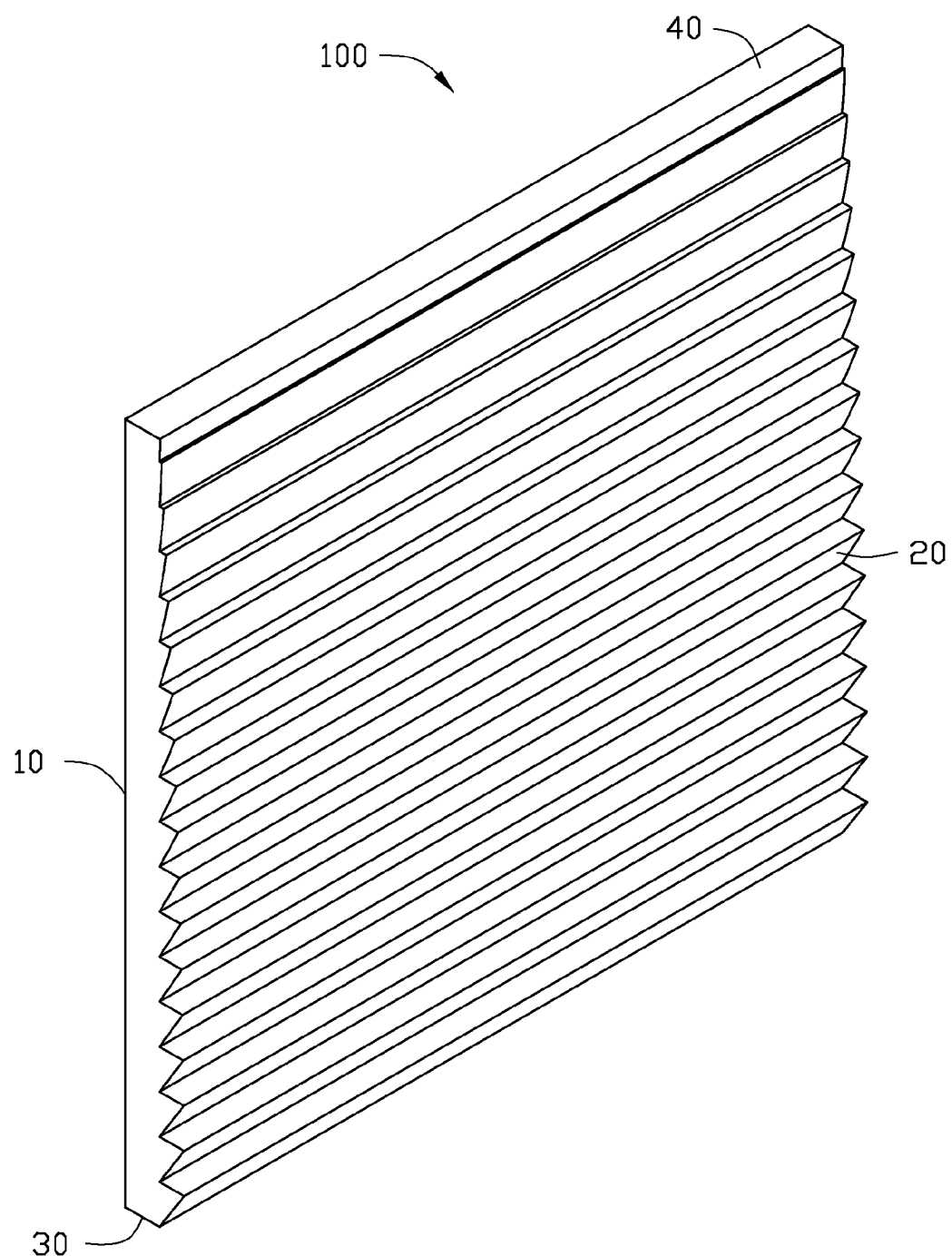
FIG. 1 is an isometric view of an embodiment of a window glass.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a window glass. The window glass comprises an incident surface, an emergent surface opposite to the incident surface, a bottom surface, and a top surface opposite to the bottom surface. The incident surface and the emergent surface are interconnected between the top surface and the bottom surface. A plurality of sawteeth is defined on the emergent surface. Each sawtooth comprises a first surface adjacent to the top surface and a second surface adjacent to the bottom surface. In each sawtooth, an angle between the first surface and the incident surface is over 90 degrees. The second surface and the incident surface defines an acute angle. The acute angle increases from the top surface to the bottom surface.

FIG. 1 illustrates a window glass 100 of an embodiment. The window glass 100 includes an incident surface 10, an emergent surface 20, a bottom surface 30, and a top surface 40.

The incident surface 10 and the emergent surface 20 are positioned at opposite sides of the window glass 100. The bottom surface 30 is opposite to the top surface 40. The bottom surface 30 is located at a side of the window glass 100 close to the ground. The top surface 40 is located at a side of the window glass 100 away from the ground. The incident surface 10 and the emergent surface 20 are interconnected between the bottom surface 30 and the top surface 40. In one embodiment, the top surface 40 is substantially parallel to the bottom surface 30, and the bottom surface 30 is substantially parallel to the horizontal plane.

Figure 2:
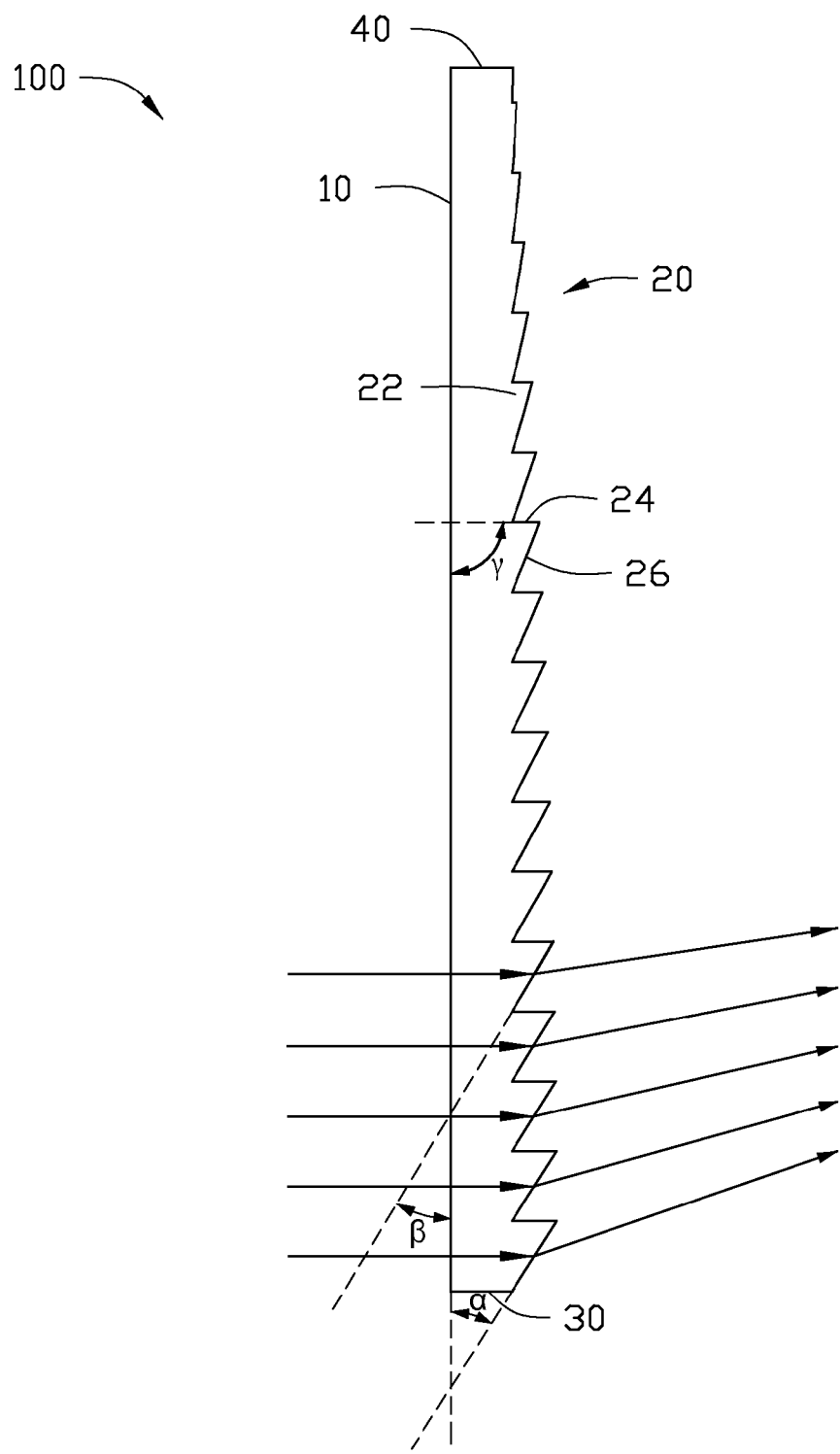
FIG. 2 is a diagrammatic view showing a first light path of sunlight penetrating the window glass of FIG. 1 perpendicular to the window glass.

FIG. 2 illustrates that the incident surface 10 is substantially a flat plane. In one embodiment, the incident surface 10 is substantially perpendicular to the ground. A plurality of sawteeth 22 is defined on the emergent surface 20. Each sawtooth 22 includes a first surface 24 and a second surface 26. The first surface 24 intersects with the second surface 26 to define an included angle. In one embodiment, a second surface 26 is interconnected between two adjacent first surfaces 24. The sawteeth 22 are arranged from the top surface 40 to the bottom surface 30. Each sawtooth 22 protrudes from the window glass 100 along a direction parallel to the horizontal plane. In each sawtooth 22, the first surface 24 is adjacent to the top surface 40 and the second surface 26 is adjacent to the bottom surface 30. An included angle γ between the first surface 24 and the incident surface 10 exceeds 90 degrees. In one embodiment, the first surface 24 is substantially perpendicular to the incident surface 10, and the included angle γ between the first surface 24 and the incident surface 10 is about 90 degrees. In each sawtooth 22, the second surface 26 and the incident surface 10 define an acute angle. The included angle between the second surface 26 of each sawtooth 22 and the incident surface 10 increases from the top surface 40 down to the bottom surface 30. That is, an included angle α between the second surface 26 of a sawtooth 22 close to the bottom surface 30 is greater than an angle β between a second surface 26 of a sawtooth 22 which is close to the top surface 40.

FIG. 2 illustrates that in the early morning, sunlight striking the incident surface 10 substantially perpendicularly passes through the glass, to be deflected by the sawteeth 22 onto a ceiling of the building. While the included angle α is greater than the included angle β, the deflected light is largely distributed on the ceiling.

Figure 3:
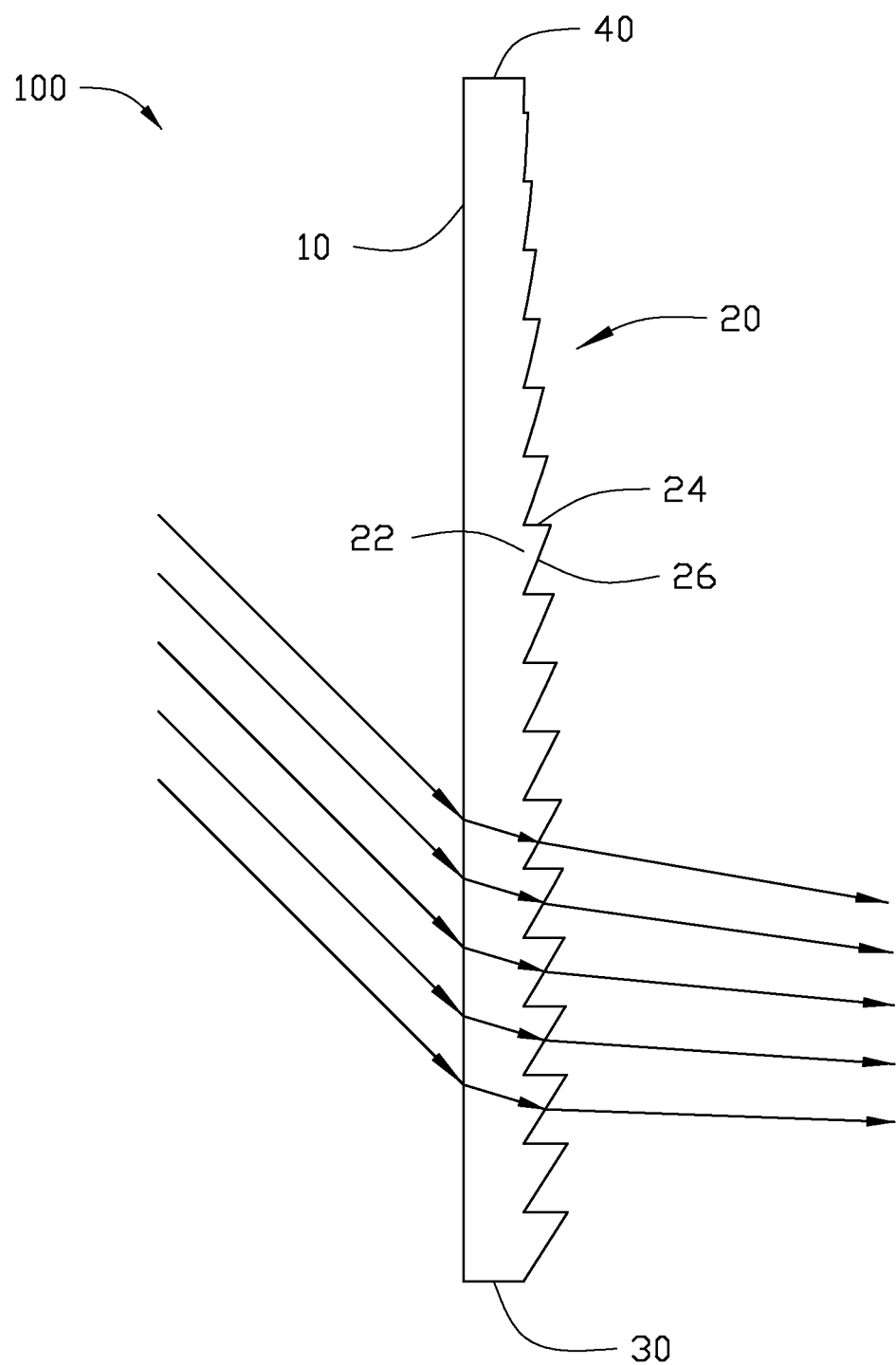
FIG. 3 is a diagrammatic view showing a second light path of sunlight penetrating the window glass of FIG. 1 with an incidence angle of about 45 degrees.

FIG. 3 illustrates that in one embodiment, in the morning or in the afternoon, sunlight striking the incident surface 10 at 45 degrees is deflected by the sawteeth 22 along a direction substantially parallel to the ground instead of being reflected by the objects arranged in the building.

The embodiments shown and described above are only examples. Many details are often found in the art such as the other features of a window glass. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A window glass comprising:
   a top surface;
   a bottom surface opposite to the top surface;
   an incident surface interconnected between the top surface and the bottom surface; and
   an emergent surface interconnected between the top surface and the bottom surface and opposite to the incident surface, the emergent surface defining a plurality of sawteeth, each sawtooth comprising a first surface and a second surface intersected with the first surface, an angle between the first surface of each sawtooth and the incident surface exceeding 90 degrees, the second surface and the incident surface defining an acute angle, the acute angle increasing gradually from the top surface to the bottom surface, and an area of the first surface of each sawteeth increasing gradually from the top surface to the bottom surface, wherein in each sawtooth, a distance between the first surface and the top surface is less than a distance between the second surface and the top surface.

2. The window glass of claim 1, wherein a second surface interconnects between two adjacent first surfaces.

3. The window glass of claim 1, wherein the incident surface is substantially a flat plane.

4. The window glass of claim 3, wherein the incident surface extends substantially perpendicular from the top surface to the bottom surface.

5. The window glass of claim 1, wherein the top surface is substantially parallel to the bottom surface.

6. The window glass of claim 5, wherein the bottom surface is substantially parallel to a ground.

7. The window glass of claim 1, wherein a distance from an intersection of the first surface and second surface of each sawtooth to the incident surface increases gradually from the top surface to the bottom surface.

8. The window glass of claim 7, wherein a second surface interconnects between two adjacent first surfaces.

9. The window glass of claim 7, wherein the incident surface is substantially a flat plane.

10. The window glass of claim 9, wherein the incident surface extends substantially perpendicular from the top surface to the bottom surface.

11. The window glass of claim 7, wherein the top surface is substantially parallel to the bottom surface.

12. The window glass of claim 11, wherein the bottom surface is substantially parallel to a ground.

* * * * *